R. McChesney,
Scroll Saw
No. 108,921. Patented Nov. 1, 1870.

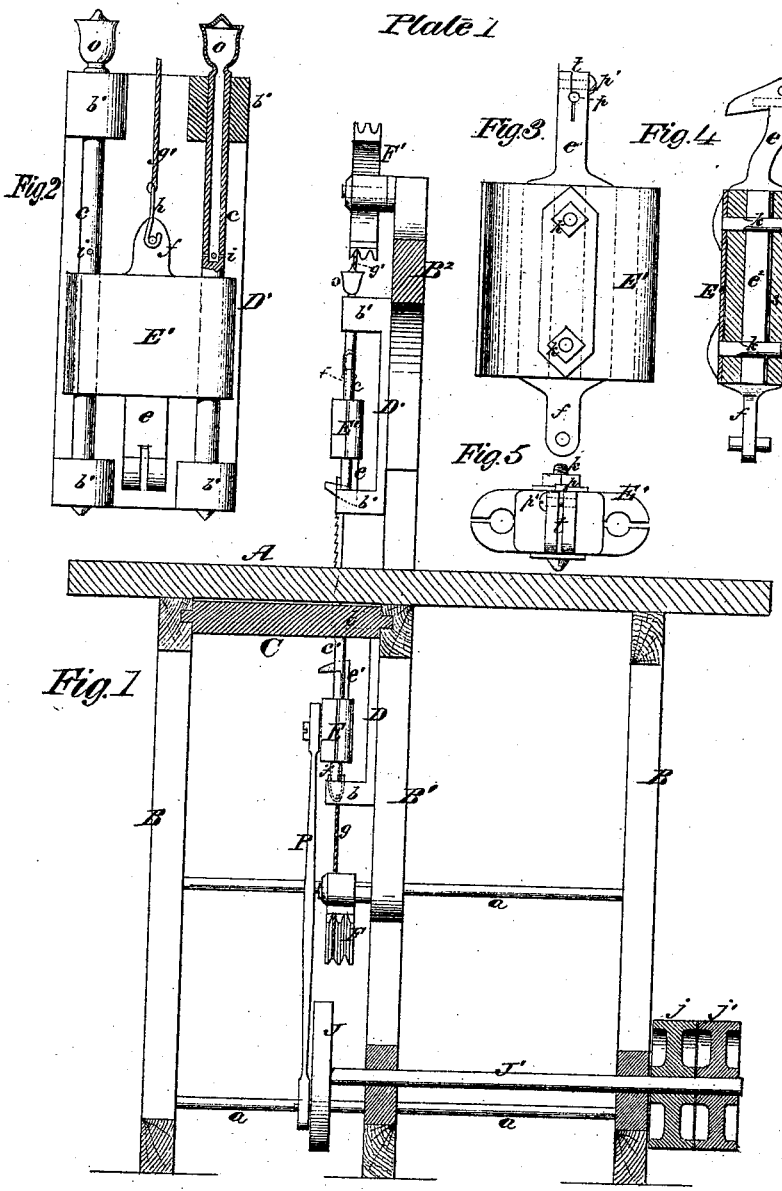

Witnesses:

Inventor:
Reuben McChesney
by his Attorney
Mason Fenwick Lawrence

United States Patent Office.

REUBEN McCHESNEY, OF BIRMINGHAM, CONNECTICUT, ASSIGNOR TO HIMSELF, THOMAS L. CORNELL, AND SIDNEY CORNELL.

Letters Patent No. 108,921, dated November 1, 1870.

IMPROVEMENT IN SCROLL-SAWS.

The Schedule referred to in these Letters Patent and making part of the same.

*To all whom it may concern:*

Be it known that I, REUBEN McCHESNEY, of Birmingham, in the county of New Haven and State of Connecticut, have invented certain new and useful Improvements in Scroll Sawing-Machines; and I do hereby declare that the following is a full, clear, and exact description thereof, reference being had to the accompanying drawing making part of this specification, in which—

Figures 6, 9:
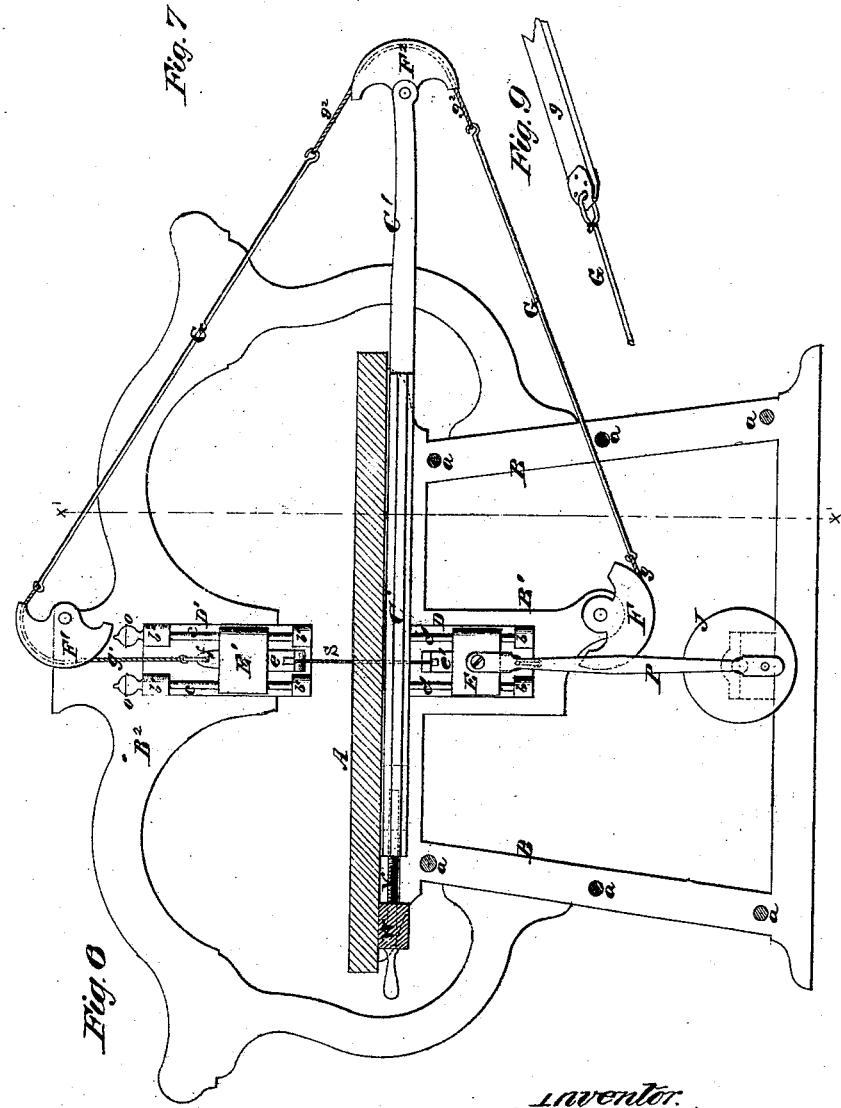

Figure 1, plate 1, is a section through the frame of the machine, taken in the vertical plane indicated by the dotted line $x\ x$, in fig. 6.

Figure 2, plate 1, is the front view of the upper block for the saw, and the guides therefor, showing, by a section of one of the guide-rods, the method of oiling the block.

Figures 3, 4, and 5, plate 1, show the construction of the saw-blocks, and also the device for adjusting the saw for rake.

Figure 6, plate 2, is a front elevation of the machine with the front portion of the table removed to expose the adjustable pulley-carrying slide.

Figure 7:
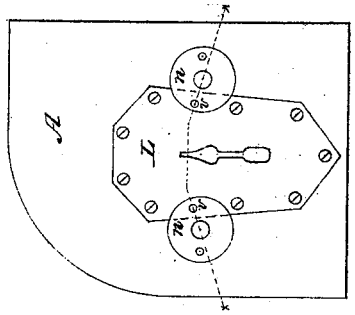
Figure 8:
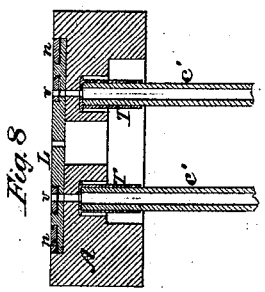

Figures 7 and 8, plate 2, are views in detail, showing the method of oiling the lower saw-block through the table and guide-rods.

Figure 9, plate 2, shows a portion of a flexible strap, and a stiff rod for keeping the saw under strain.

Similar letters of reference indicate corresponding parts in the several figures.

This invention relates to certain novel improvements in machines for sawing all kinds of scroll-work, wherein the saw is held under tension by means of flexible connections working around pulleys.

The nature of my invention consists—

First, in the combination of comparatively stiff and inextensible connections with flexible connections, as means for keeping the saw under proper tension.

Second, in providing for oiling the saw-blocks through the guides on which these blocks work.

Third, in providing for giving the saw any desired degree of rake, by splitting the saw-stirrup of the upper saw-block, and using an adjustable back rest, in combination with a clamping screw for positively retaining the back-rest in place.

Fourth, in a divided saw-carrying block, having an elastic material interposed between its halves, and also clamping-screws for securing the two halves together and adjusting them for wear.

To enable others skilled in the art to understand my invention, I will describe its construction and operation.

In the accompanying drawing—

A represents the table-top, and

B, the frame, supporting the same, which may be constructed in any suitable manner.

$B^1$ is a rigid pendant, for holding the lower guide D, and $B^2$ is an arched frame, rising above the table-top A, for supporting the upper guide D' and pulley segment $F^1$.

The guide D' and the pulley segment F may be applied to a pendant which is secured to the ceiling timbers of the room in which the machine is arranged.

The saw S is strained between hooked extensions $e\ e^1$ of vertically-sliding blocks E E'.

The slide block E is arranged beneath the table-top A, and moves on guide-rods $c'\ c'$, applied to offsets of the guide D.

This lower block E has a pitman-rod, P, applied to it, the lower end of which pitman is applied to a wrist-pin on a crank-wheel, J.

This wheel is keyed on a shaft, J', carrying fast-and-loose pulleys $j'\ j'$, as shown in fig. 1.

The guide-rods $c'\ c'$ are bored out, as shown in fig. 8, plate 2, and, at the lower termination of the bores outlets are made laterally through the rods.

The upper ends of these hollow rods are capped by thimbles T T, through the upper ends of which holes are made that register with holes $v\ v$ made through plate L.

To plate L circular rotary covers $n\ n$ are applied, which are also perforated, and which, like plate L, are let into the table-top flush with its surface. The lateral intersecting outlets through rods $c'\ c'$ are, say about the middle of their length, so that, when the block E is in motion and oil is put into the upper ends of the rods, this block will be lubricated.

The oil is introduced into the rods $c'\ c'$ through the perforations made through covers $n$, plate L, and thimbles T T, after which a slight turn of the covers $n\ n$ will cause them to close the inlets and prevent the entrance of dust into the rods. To prevent a too rapid flow of the oil to the block E, some soft porous material may be introduced into the tubular portions of the rods $c'$.

The sliding block E' is arranged above the table, and moves on guide-rods $c\ c$, applied rigidly to off-sets $b'$ of the guide D'.

The guides $c\ c$ are bored out precisely as described for guides $c'\ c'$, and are provided, at their upper ends, with oil-receiving cups $o\ o$.

At the lower end of the tubular portion of each rod outlets $z'$ are made, for the supply of oil to the block E', as it rises and descends.

The hooked extension or stirrup $e$ is split vertically, as shown in figs. 3 and 5, to receive the saw, and also to receive a pin, $p$. This pin affords a back-rest or bearing for the upper end of the saw, and can be adjusted endwise for giving the desired rake to the saw.

A clamp-screw, $p'$, is used to draw together the split portions of the stirrup $e$, and so confine the pin $p$ that it cannot slip nor work loose during the operation of the machine.

The saw S is strained by means of flexible connections $g$ $g^1$ $g^2$, which are attached, respectively, to pulley segments F $F^1$ $F^2$, and to stiff connecting-rods G G.

Prior to this part of my invention a flexible strap or belt extended from one end of the saw, over pulleys, to the other end of the saw, for the purpose of keeping the saw under tension; but it was found that the material used for the said belt or strap would stretch, and was materially affected by hydrometic changes. To obviate this, and, at the same time, to obtain flexibility of the belt at the pulleys, I combine, with the short flexible straps $g$ $g^1$ $g^2$, the stiff rods G G.

The rods will not be materially affected by strain on them, and the straps, which may be made of rawhide, or other suitable material, are so short that they will not be materially shortened or lengthened from severe strain or other cause.

The pulleys F $F^1$ $F^2$ may be made circular or segmental, and they may be made with single or double grooves in their peripheries.

The drawing shows double grooves in each pulley, with two short flexible connections for each; but a single groove, with one short flexible connection for each pulley, may be used.

The flexible connections $g$ $g^1$ $g^2$ are, respectively, secured fast to their pulleys, so that they cannot slip on them, thus allowing a positive motion to be imparted to the saw, both in its up-and-down movements.

The pulley F is applied to an arm, C', of an adjustable piece, C arranged beneath the table-top A, between guides.

The piece C, with its arm C', can be adjusted endwise, by means of a hand-screw, V, which passes loosely through a fixed bearing, W, shown in fig. 6.

By this adjustment it will be seen that any desired degree of tension can be given to the saw, whether in motion or at rest.

Each one of the saw-blocks is constructed so that it can be adjusted to compensate for wear on the guide-rods.

By reference to figs. 3, 4, and 5, it will be seen that the block E' is composed of two halves, which are clamped together by means of nuts on screw-bolts $k$ $k$.

The tang $f$ and hook $e$ are connected together by shank $e^2$, which is recessed into the two halves of the blocks.

By introducing a piece of India rubber, $s$, between the shank $e^2$ and one of the block sections, these sections can be properly set up to their guide-rods, and compensation allowed for adjustment as the bearing surfaces wear away.

The rubber $s$ will prevent the nuts or bolts $k$ $k$ from wearing loose. In this way I am enabled to keep the saw-blocks properly set up to their guide-rods and prevent irregular motion of the saw.

Having described my invention,

What I claim as new, and desire to secure by Letters Patent, is—

1. The combination of the two rods G G, three flexible sections $g$ $g^1$ $g^2$, three segments or pulleys F $F^1$ $F^2$, saw S, blocks E E', straight sliding device C', and adjusting device W V, all arranged and operating in the manner and for the purpose herein described.

2. The combination of the block E or E', constructed as shown, and the perforated hollow guide-rods $c$ $c$, carrying oil, as an oil-chamber, and supplying the same to the external head-block E or foot-block E' of a saw which is guided by them, substantially as described.

3. The movable covers $n$ $n$, and the thimbles T T, combined with the lower perforated guide-rods $c'$ $c'$, substantially as described.

4. The split saw-stirrup $e$, having the adjustable back-rest $p$ and clamp-screw $p'$ applied to it, substantially as described.

5. The combination of the device $e$ $e^2$ $f$, divided saw-carrying block E or E', elastic strip $s$, screws $k$ $k$, and nuts, substantially as shown and described.

6. Straight moving adjustable support C' pulley $F^2$, flexible section $g^2$, rods G G, pulleys $F^1$ F, flexible sections $g$ $g^1$, saw S, and adjustable device V W, combined and arranged substantially in the manner described.

REUBEN McCHESNEY.

Witnesses:
JOHN W. CHAMBERS.
D. R. GARDEN.